Patented Aug. 12, 1941

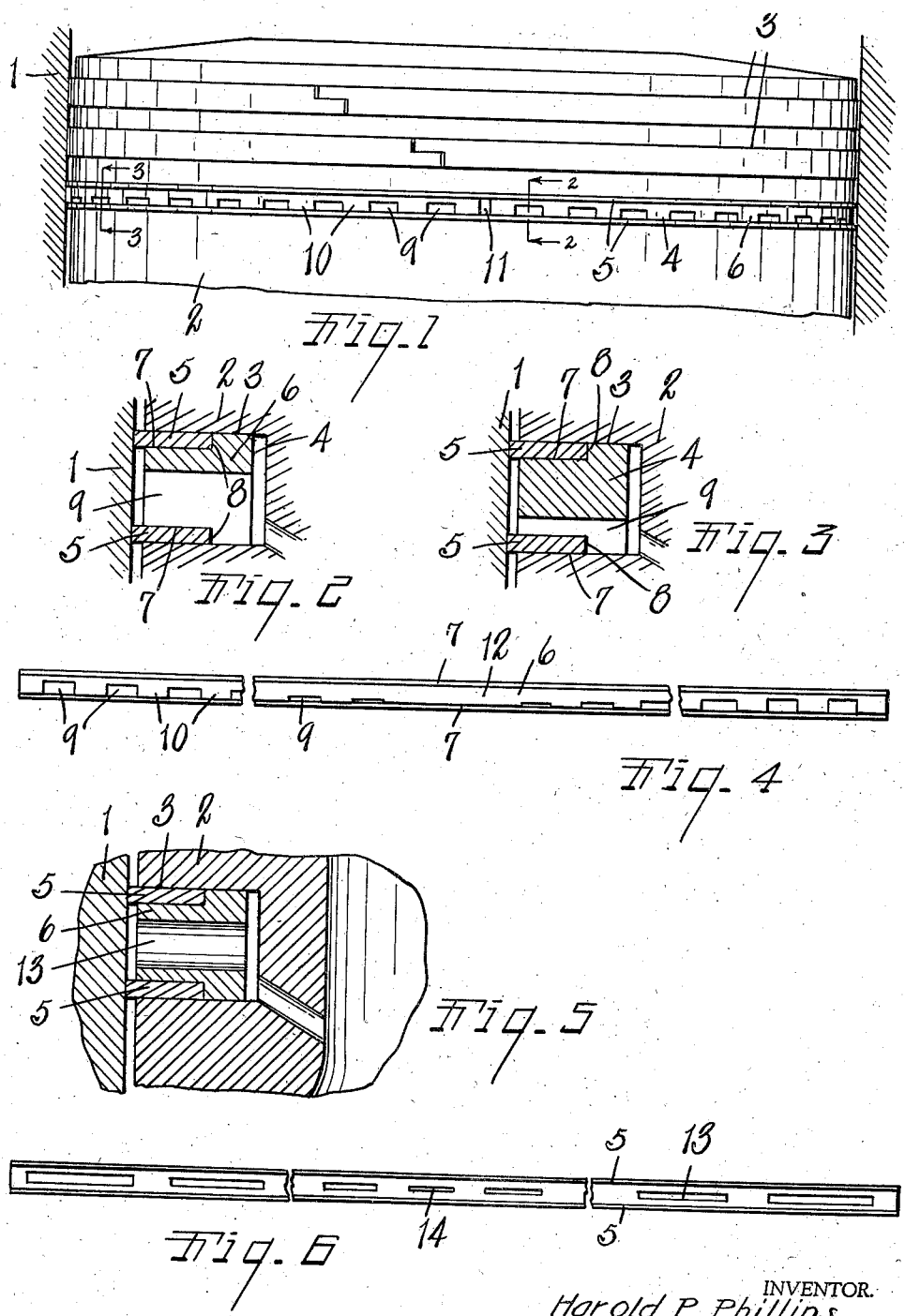

2,252,199

UNITED STATES PATENT OFFICE 2,252,199

PISTON RING

Harold P. Phillips, Hastings, Mich., assignor to Hastings Manufacturing Company, Hastings, Mich., a corporation of Michigan Application February 25, 1939, Serial No. 258,359

4 Claims. (Cl. 309—45)

This invention relates to improvements in piston rings.

The main objects of this invention are:

First, to provide a composite piston ring for internal combustion engine pistons having improved wearing and sealing qualities.

Second, to provide a composite ring of the type described including a plurality of cylinder wall contacting elements of wear resistant material and an element carrying and spacing said wall contacting elements and imparting adequate cylinder wall tension thereto.

Third, to provide a composite oil ring for an internal combustion engine characterized by its high unit wall tension and low total cylinder wall drag.

Fourth, to provide an oil ring of the type described including a plurality of cylinder wall contacting elements and a carrier and spacer therefor having novel provisions for increasing the strength thereof.

Fifth, to provide an oil ring for an internal combustion engine piston having provision for draining oil therethrough arranged to equalize the tension of the ring.

Sixth, to provide a composite oil ring including a plurality of cylinder wall contacting elements and a carrying and spacer element therefor from which the first named elements derive their cylinder wall tension, in combination with provisions whereby the tension of the last named element, and accordingly the total unit tension of the ring, is increased.

Objects relating to details and economies of the invention will appear from the description to follow. The invention is defined in the claims.

Preferred embodiments of the invention are illustrated in the accompanying drawing, wherein:

Fig. 1 is a fragmentary side view illustrating an internal combustion engine piston and cylinder, the former of which is provided with a composite oil ring in accordance with the invention.

Figs. 2 and 3 are enlarged fragmentary views in section on lines 2—2 and 3—3, respectively, of Fig. 1.

Fig. 4 is a view in elevation illustrating the ring assembly of the invention in developed or flat form.

Fig. 5 is an enlarged fragmentary view in vertical section illustrating a modified embodiment of an oil ring in accordance with the invention.

Fig. 6 is a view in elevation similar to Fig. 4 illustrating the composite ring assembly of Fig. 5.

In the patent to Harold P. Phillips, No. 2,148,997, of February 28, 1939, there is illustrated and described a composite piston ring for an internal combustion engine, including a pair of thin cylinder wall contacting elements preferably of ribbon steel, a spacer therefor, and an inner expanding member or spring for imparting radial thrust to the assembly. The present invention relates to improvements in composite rings of that type, being more particularly concerned in certain of its phases with a ring and having provisions whereby the use of an inner expanding ring or spring may be dispensed with if desired, as well as provisions for increasing the tension of an oil ring by reason of a novel formation of the oil drainage openings therein.

Referring to the drawing, wherein the assembly of my invention is illustrated in magnified form and with no attempt made to present the exact relative dimensions, the reference numeral I indicates the cylinder of an internal combustion engine, having a piston 2 reciprocable therein, which is provided with a plurality of annular grooves 3, one of which is adapted to receive the oil ring assembly 4 of our invention.

The aforesaid assembly consists of a pair of thin split cylinder wall engaging elements 5 of ribbon steel and a body or carrier and spacer element 6 therefor, the last named element being in the form of a split ring which is rabbeted or recessed annularly on its sides at 7 to provide annular shoulders 8, the rabbets or recesses receiving the cylinder wall engaging elements 5 and the shoulders supporting them radially and the member 6 imparting sufficient radial thrust thereto to obtain the desired high unit wall tension upon which the efficiency of operation of an oil ring mainly depends.

The element 6 is preferably of cast iron and is constructed of such size as to expansibly fit within the groove and support the elements 5 with the desired unit pressure. In view of the fact that oil control in an internal combustion engine depends largely upon unit cylinder wall pressure, it will be apparent that the steel wall engaging area of the elements 5 may be materially reduced beyond the area corresponding to a width found satisfactory and necessary for cast iron and, moreover, the wall engaging surface is much harder and therefore more wear resisting. It has been found that cast iron cylinder wall contacting sections are not durable in widths of less than .030 inch because of the danger of crumbling and the rapid wear characterizing the same, likewise their susceptibility to breakage.

In comparison to a cast iron wall contacting section of .030 inch in width, steel cylinder wall contacting sections of widths of from .024 to .010 inch, and of more than twice the hardness, having tough, hard, wear resisting characteristics, because of the different molecular structure of tempered steel, can be employed. The nature of the entire assembly is affected because of the high unit wall tension and low total cylinder wall drag produced. Furthermore, because of the aforesaid thinness, the intermediate carrier or spacer element 6 may have a comparatively great over-all width and this width may be controlled as desired to control the tension of the assembly accordingly. Still further, by engaging the elements 5 with shoulders 8 on the cast iron spacer 6, it will be apparent that the radial dimension of the aforesaid elements may be decreased without decreasing the effectiveness thereof, which is an important feature in connection with the economy of production of the assembly.

The oil drainage openings 9 are, in the embodiment illustrated in Figs. 1 to 4 inclusive, in the form of slots milled through from the lower edge of the cast iron section 6, being separated by the uniformly spaced partitions 10. These partitions, it will be understood, are recessed or rabbeted at 7 similar to the continuous upper recess to receive the lower element 5. I have found that in hitherto known oil rings, wherein oil drainage or ventilating openings have been machined around a cast iron spacer in nearly even or geometrical circumferential arrangement, the result is that the ring is weakened so far as its radial action is concerned. This weakening, due to removal of metal from the ring, is particularly pronounced adjacent the heel of the ring, i. e., the point 180° from or opposite the gap or split. It is at this point that the leverage exerted on the ring in closing the same to cylinder wall dimensions is greatest, which leverage gradually decreases as the gap is approached. The effect of the resultant non-uniform thrust of the ring attributable to the aforesaid weakening is a non-uniformity of cylinder wall engagement, with the further result that in the frequently occurring event of non-uniformities or waves or irregularities in the cylinder wall an imperfect sealing action is obtained.

In order to eliminate these objections, I eliminate from one to three of the notches or openings 9 in the spacer 6 at the point of greatest stress, namely, 180° from the split or gap 11 therein, the area at which the openings are omitted being designated by the numeral 12, see Fig. 4. As a further provision to this end and to make the construction of the ring even more correct from a standpoint of resistance to stress and loading, I contemplate that the oil drainage or ventilating openings 9 shall be of graduated area; namely, immediately adjacent area 12 the size of the openings is a minimum and the area of the individual openings 9 increases gradually to a maximum immediately adjacent the split 11. Preferably, although it will be apparent that variations in this respect are possible, the notches or openings 9 commence at a point one-half inch on each side of the point exactly 180° from the split 11, the area 12 being therefore of a length of one inch. In the embodiment of Fig. 4, the variation in size of the openings 9 is effected by a graduating in the vertical dimension thereof, although it is possible to effect this end in other ways.

For example, in Figs. 5 and 6, I illustrate a slightly modified embodiment of my invention, wherein the oil drainage openings 13 are in the form of slots or holes machined in the cast iron spacer element 6 approximately midway between the upper and lower edges thereof. The individual slots 13, as will be evident from an inspection of Fig. 6, increase in area from a minimum 14 at or adjacent the midpoint of the developed ring shown there to a maximum adjacent the ends or split 11 of the ring, i. e., from a minimum at the point 180° from the split to a maximum at the split. In the embodiment of Figs. 5 and 6, this variation in size is effected by a graduation of the circumferential lengths of the slots. The result of the aforenoted provision is the same as that referred to and discussed relative to Figs. 1 to 4, namely, an equalization in the tension of the spacer 6 and an accompanying corresponding equalization in the tension of the assembly. The unit wall tension is increased by the small area of wall contact of the thin steel elements 5 permitting the desired oil control to be obtained without excessive wear or sacrifice of durability.

In Fig. 6 I have omitted to show the unperforated area 12 illustrated in Fig. 4 inasmuch as this provision may be utilized or not as desired. It should be understood, however, that in either of the embodiments it is possible to further the strength of the spacer by leaving out the notching at the spacer midpoint.

Further modifications of the inventive principle of my assembly will be apparent to those skilled in the art. For example, the oil drainage openings, whether of uniform size or of graduated sizes might be spaced at graduated distances in order to effect a preservation of the uniformity of radial thrust of the assembly as a whole. My invention comprehends any such expedient so far as the particular design of any of the elements is concerned, it being understood that I desire to claim broadly the combination of a pair of hard thin wear resistant elements, whereby high unit wall tension is attainable, with a carrier and spacer element therefor having provision for increasing the tension imparted to the elements, so that the assembly may be utilized in a piston ring groove without further expanding means such as the usual expanding spring, although it should be understood that in case it is desired, nothing in my assembly prevents or is detracted from in effectiveness by such an inner expanding member.

I have illustrated and described my improvements in embodiments which I have found very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. A composite oil ring assembly for an internal combustion engine, comprising a pair of thin split cylinder wall contacting elements of ribbon steel disposed in edge contacting relation to a cylinder wall, and a split cast iron carrier and spacer element for said first named elements, said spacer fitting in a groove in the piston and having annular outer recesses on its upper and lower sides providing annular shoulders engageable with said cylinder wall engaging elements to impart cylinder wall tension thereto, said spacer element having a plurality of oil drainage openings therein, said openings being omitted from the area of the spacer approximately 180° from the split of the spacer and being graduated increasingly in individual size from points adjacent said area to a maximum adjacent the split thereof.

2. A composite oil ring assembly for an internal combustion engine, comprising a pair of thin split cylinder wall contacting elements disposed in edge contacting relation to a cylinder wall, and a split carrier and spacer element for said first named elements, said spacer fitting in a groove in the piston and having annular outer recesses on its upper and lower sides providing annular shoulders engageable with said cylinder wall engaging elements to impart cylinder wall tension thereto, said spacer element having a plurality of oil drainage openings therein, said openings being graduated increasingly in individual size from points adjacent the midpoint of the spacer element to a maximum adjacent the split thereof.

3. A composite piston ring assembly comprising a body element having peripheral annular recesses in the sides thereof extending to the outer face of the body element and providing annular abutment shoulders, and thin split cylinder wall engaging elements of relatively hard material adapted to be disposed with the narrow edge thereof in engaging relation to a cylinder wall, the inner surface of said last named elements engaging said shoulders, said body element being out of contact with the cylinder wall and having a plurality of radial oil drainage openings therein of graduated sizes from the split therein to points approximately 180° from the split.

4. A composite oil ring for an internal combustion engine, comprising a split annular element having upper and lower annular recesses in the sides thereof extending to the outer face of the element and providing annular abutment shoulders, and thin split cylinder wall engaging elements of relatively hard wear resistant material, the inner surface of said last named elements engaging said shoulders and the outer surface engaging the cylinder wall, said first named element being out of contact with the cylinder wall and having a plurality of radial oil drainage openings provided therein in a manner to gradually increase the resistance of the first named element to bending from a point approximately 180° from the split therein to the split.

HAROLD P. PHILLIPS.